United States Patent
Iovanna et al.

(10) Patent No.: US 9,313,142 B2
(45) Date of Patent: Apr. 12, 2016

(54) LINK ADVERTISEMENT FOR PATH COMPUTATION IN A COMMUNICATIONS NETWORK

(75) Inventors: Paola Iovanna, Rome (IT); Cristiano Zema, Pisa (IT); Fabio Ubaldi, Perugia (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 125 days.

(21) Appl. No.: 13/641,150

(22) PCT Filed: Nov. 10, 2010

(86) PCT No.: PCT/EP2010/067204
§ 371 (c)(1),
(2), (4) Date: Jan. 16, 2013

(87) PCT Pub. No.: WO2011/128002
PCT Pub. Date: Oct. 20, 2011

(65) Prior Publication Data
US 2013/0114409 A1    May 9, 2013

Related U.S. Application Data

(60) Provisional application No. 61/323,995, filed on Apr. 14, 2010.

(51) Int. Cl.
*H04L 12/26* (2006.01)
*H04L 12/911* (2013.01)
*H04L 12/751* (2013.01)
*H04L 12/729* (2013.01)
*H04L 12/721* (2013.01)

(52) U.S. Cl.
CPC ............... *H04L 47/70* (2013.01); *H04L 45/02* (2013.01); *H04L 45/125* (2013.01); *H04L 45/62* (2013.01)

(58) Field of Classification Search
None
See application file for complete search history.

(56) References Cited

PUBLICATIONS

International Search Report for PCT/EP2010/067204, mailed Jul. 4, 2011.
Vigoureux et al., "Generalized Multi-Protocol Label Switching (GMPLS) Protocol Extensions for Multi-Layer and Multi-Region Networks (MLN/MRN); draft-ietf-ccamp-gmpls-min-extensions-12.txt", Internet Society, vol. 12, (Feb. 22, 2010), pp. 1-25.
Papadimitriou et al., "Requirements for GMPLS-Based Multi-Region and Multi-Layer Networks (MRN/MLN); rfc5212.txt", IETF Standard, Internet Engineering Task Force, (Jul. 1, 2008), 25 pages.
(Continued)

*Primary Examiner* — Afshawn Towfighi
(74) *Attorney, Agent, or Firm* — Baker Botts, LLP

(57) ABSTRACT

A path computation element for a communications network, receives link advertisements from hybrid nodes (10) of the network and selects paths for new traffic flows based on the received link advertisements. The hybrid node has switching matrices (20, 30) operable using different protocols, and has internal links between the switching matrices. The link advertisements indicate a maximum and in a minimum bandwidth on any one of the internal links for a new traffic flow. The element can select a path via the hybrid node for a new traffic flow according to the bandwidth of the requested new traffic flow and according to the maximum and the minimum bandwidth indicated by the link advertisements. Advertising the maximum and minimum bandwidths available for a single new traffic flow for the internal links can enable more efficient path computation with little additional cost and hence maintain scalability of the link advertisements for larger networks.

16 Claims, 10 Drawing Sheets

(56) References Cited

PUBLICATIONS

Leroux et al., "Evaluation of Existing GMPLS Protocols against Multi-Layer and Multi-Region Networks (MLN/MRN); rfc5339.txt", Internet Engineering Taskforce, (Sep. 1, 2008), 25 pages.

Papadimitriou, D., et al., "Generalized Multi-Protocol Label Switching (GMPLS) Protocol Extensions for Multi-Layer and Multi-Region Networks (MLN/MRN)," Expiration Date Aug. 20, 2010; Creation Date Feb. 21, 2010.

Shiomoto, K., et al., "Procedures for Dynamically Signaled Hierarchical Label Switched Paths," Expiration Date Aug. 27, 2010; Creation Date Feb. 27, 2010.

Mannie, E., "Generalized Multi-Protocol Label Switching (GMPLS) Architecture," Oct. 2004, RFC 3945.

Rekhter, Y., et al., "A Border Gateway Protocol 4 (BGP-4)," Jan. 2006, RFC 4271.

Ash, J., et al., "Path Computation Element (PCE) Communication Protocol Generic Requirements," Sep. 2006, RFC 4657.

Farrel, A., et al., "A Path Computation Element (PCE)-Based Architecture," Aug. 2006, RFC 4655.

Kompella, K., et al., "Routing Extensions in Support of Generalized Multi-Protocol Label Switching (GMPLS)," Oct. 2005, RFC 4202.

Kompella, K., et al., "OSPF Extensions in Support of Generalized Multi-Protocol Label Switching (GMPLS)," Oct. 2005, RFC 4203.

Kompella, K. et al., "Label Switched Paths (LSP) Hierarchy with Generalized Multi-Protocol Label Switching (GMPLS) Traffic Engineering (TE)," Oct. 2005, RFC 4206.

Le Roux, JL., et al., "Evaluation of Existing GMPLS Protocols Against Multi-Layer and Multi-Region Networks (MLN/MRN)," Sep. 2008, RFC 5339.

Shiomoto, K., et al., "Requirements for GMPLS-Based Multi-Region and Multi-Layer Networks (MRN/MLN)," Jul. 2008, RFC 5212.

Katz, D., et al., "Traffic Engineering (TE) Extensions to OSPF Version 2," Sep. 2003, RFC 3630.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Lower SC      | Lower Encoding| Upper SC      |Upper Encoding |
+-+-+-+-+-+-+-+-+-+-+-+-+-+-+-+-+-+-+-+-+-+-+-+-+-+-+-+-+-+-+-+-+
|                  Max LSP Bandwidth at priority 0              |
+-+-+-+-+-+-+-+-+-+-+-+-+-+-+-+-+-+-+-+-+-+-+-+-+-+-+-+-+-+-+-+-+
|                  Max LSP Bandwidth at priority 1              |
+-+-+-+-+-+-+-+-+-+-+-+-+-+-+-+-+-+-+-+-+-+-+-+-+-+-+-+-+-+-+-+-+
|                  Max LSP Bandwidth at priority 2              |
+-+-+-+-+-+-+-+-+-+-+-+-+-+-+-+-+-+-+-+-+-+-+-+-+-+-+-+-+-+-+-+-+
|                  Max LSP Bandwidth at priority 3              |
+-+-+-+-+-+-+-+-+-+-+-+-+-+-+-+-+-+-+-+-+-+-+-+-+-+-+-+-+-+-+-+-+
|                  Max LSP Bandwidth at priority 4              |
+-+-+-+-+-+-+-+-+-+-+-+-+-+-+-+-+-+-+-+-+-+-+-+-+-+-+-+-+-+-+-+-+
|                  Max LSP Bandwidth at priority 5              |
+-+-+-+-+-+-+-+-+-+-+-+-+-+-+-+-+-+-+-+-+-+-+-+-+-+-+-+-+-+-+-+-+
|                  Max LSP Bandwidth at priority 6              |
+-+-+-+-+-+-+-+-+-+-+-+-+-+-+-+-+-+-+-+-+-+-+-+-+-+-+-+-+-+-+-+-+
|                  Max LSP Bandwidth at priority 7              |
+-+-+-+-+-+-+-+-+-+-+-+-+-+-+-+-+-+-+-+-+-+-+-+-+-+-+-+-+-+-+-+-+
|           Adjustment Capability-specific information (variable)|
+-+-+-+-+-+-+-+-+-+-+-+-+-+-+-+-+-+-+-+-+-+-+-+-+-+-+-+-+-+-+-+-+
```

FIG 6

OPTICAL LINKS HAVING MULTIPLEX STRUCTURE OF TRIB SLOTS CORRESPONDING TO DIFFERENT PORTS OF NODES

LINK ADVERTISEMENT FOR PATH COMPUTATION IN A COMMUNICATIONS NETWORK

This application is the U.S. national phase of International Application No. PCT/EP2010/067204, filed 10 Nov. 2010 and claims the benefit of U.S. Provisional Application No. 61/323,995, filed 14 Apr. 2010, the entire content of each which is hereby incorporated by reference.

TECHNICAL FIELD

This invention relates to hybrid nodes, to path computation elements and to methods of generating link advertisements at hybrid nodes, and to methods of operating path computation elements, and in particular but not exclusively to path computation and routing in communications networks, and in particular though not exclusively to internal link modeling for GMPLS routing in hybrid nodes

BACKGROUND

It is known to have communications networks having switching matrices at nodes. In some cases a node can be a hybrid node having two switching matrices operable using different protocols for different technologies, with internal links between the switching matrices. In some cases a control plane is used to generate and pass control messages between the nodes. A well known example of a type of control plane for controlling communications networks is Generalized MPLS (GMPLS) which extends MPLS (multiple protocol label switched) to handle multiple switching technologies, designated as follows: PSC (packet switch capable), L2SC (Layer-2 switch capable), TDM capable, LSC (lambda switch capable), and FSC (fiber switch capable), as stated in ref [1].

Most of the initial efforts to utilize GMPLS have been related to environments hosting devices with a single switching capability so that the resulting networks are composed by different layers and different technologies, which are called regions. Those networks are called Multi-Layer and Multi-Region Networks (MLN/MRN).

Future networks are going to integrate as much as possible the control of layers and regions, in order to optimize the exploitation of all network resources and characteristics. Therefore, network suppliers and network operators are facing new issues concerning the integration of different technologies and switching capabilities in single network devices, called hybrid nodes (i.e. nodes that can switch traffic at different layers which implies different protocols, for example at both electrical and optical layers).

By extending MPLS to support multiple switching technologies, GMPLS provides a comprehensive framework for the control of a multi-layered network of either a single switching technology or multiple switching technologies, but the integration of layers and technologies in hybrid nodes is challenging and a set of issues must be still addressed.

GMPLS-TE protocols and procedure described in IETF RFCs are quite stable concerning nodes with single switching capability, while a set of drafts, mostly from CCAMP group, are addressing the issues related to MLN/MRN networks and hybrid nodes.

In a MLN/MRN networks, the interaction between layers and regions is a key issue especially if these interactions are integrated in a single hybrid network element. This kind of element is a multi-switching-type-capable one that can terminate data links with different switching capabilities, where the data links are connected to the node by the same interface. So, it advertises a single TE link containing more than one ISCD each with a different ISC value. For example, a node may terminate PSC (packet switch capable) and TDM data links and interconnect those external data links via internal links. The external interfaces connected to the node have both PSC and TDM capabilities.

TE link advertisements issued by a hybrid node may need to provide information about the node's internal adjustment capabilities between the switching technologies supported. The term "adjustment" refers to the property of a hybrid node to interconnect the different switching capabilities that it provides through its external interfaces. The information about the adjustment capabilities of the nodes in the network allows the path computation process to select an end-to-end multi-layer or multi-region path that includes links with different switching capabilities joined by nodes that can adapt (i.e., adjust) the signal between the links.

The GMPLS control plane for hybrid node composed by heterogeneous switching capability (e.g. PSC and LSC) defines some information regarding internal link of the hybrid nodes that connect PSC and LSC). IETF proposed the Interface Adaptation Capability Descriptor (IACD) TLV (Type Length Value) in order to describe the internal links of a generic hybrid node. This object contains generic information, but without the detail typically needed for path computation.

SUMMARY

An object of the invention is to provide improved apparatus or methods. According to a first aspect, the invention provides: A node for a communications network and having: a plurality of external connections interconnected by a first switching matrix and operable according to a first protocol; and a plurality of external connections interconnected by a second switching matrix and operable according to a second protocol. At least two internal links are provided between the first and second switching matrices, each of the internal links being operable to pass a traffic flow between the first and second switching matrices and to adapt the traffic flow to suit the protocols of the switching matrices. A controller is provided to generate and send to another part of the network a link advertisement comprising an indication of a maximum bandwidth available for a single new traffic flow on any one of the internal links, and an indication of a minimum bandwidth allocable to such a new traffic flow.

By sending the maximum and minimum bandwidths available for a single new traffic flow, useful information for efficient path computation can be made available without enlarging the advertisements unduly, and hence maintaining scalability for larger networks and easing the transmission costs and processing burden involved in using such link advertisements.

Another aspect of the invention can involve a corresponding method of generating a link advertisement at a hybrid node having switching matrices operable using different protocols, and having two or more internal links between the switching matrices by determining maximum and minimum bandwidths on any one of the internal links for a new traffic flow, generating a link advertisement indicating the maximum and minimum bandwidths, and sending the link advertisement to another part of the network.

Another aspect of the invention can involve a path computation element for a communications network, the path computation element comprising an interface arranged to receive link advertisements from nodes of the communications network and a processor to select paths for new traffic flows based on the received link advertisements. At least one of the nodes is a hybrid node having switching matrices operable using different protocols, and having two or more internal links between the switching matrices, the link advertisements received from the hybrid node indicating maximum and minimum bandwidths on any one of the internal links for a new traffic flow. The processor can select a path via the hybrid node for a new traffic flow according to the bandwidth of the requested new traffic flow and according to the maximum and minimum bandwidths indicated by the link advertisements.

Again, by receiving the maximum and minimum bandwidths available for a single new traffic flow from the hybrid node, more efficient path computations can be made without needing unduly large link advertisements, hence maintaining scalability of the link advertisements for larger networks.

Another aspect of the invention provides a corresponding method of operating a path computation element, the method having the step of receiving a link advertisement from a hybrid node of a communications network, the hybrid node having switching matrices operable using different protocols, and having two or more internal links between the switching matrices. The link advertisements received from the hybrid node can indicate a maximum and a minimum bandwidth on any one of the internal links for a new traffic flow, and the method can involve selecting a path for a new traffic flow based on the received link advertisements, such that a path via the hybrid node is selected according to a bandwidth of the requested new traffic flow and according to the maximum and minimum bandwidths indicated by the link advertisement.

In other aspects, the link advertisements can have instead of (or as well as) the maximum and minimum bandwidths, an indication of a maximum aggregate protected bandwidth available for new traffic flows on all of the internal links, or an indication of a maximum aggregate bandwidth of all the internal links. There can be corresponding path computation elements, and corresponding methods of generating link advertisements or methods of computing paths.

The maximum aggregate bandwidth enables a percentage utilization or similar factor to be determined and used as a constraint in the path computation. The available protected bandwidth can be useful as a constraint for example either in routing protected traffic, or in ensuring there is still some protected bandwidth available after routing unprotected traffic.

Any additional features can be added to these aspects, or disclaimed from them, and some are described in more detail below. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 6 shows a view of a link advertisement.

DETAILED DESCRIPTION

Figure 1:
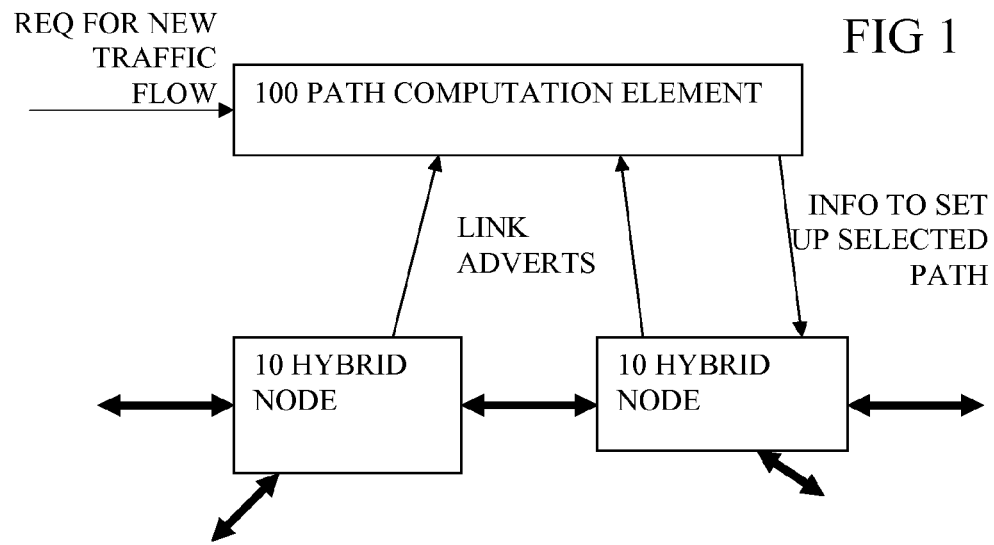
FIG. 1 shows a schematic view of parts of a network

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of node for switching traffic flows, not limited to the types described, not limited to any level of integration, or size or bandwidth or bit rate and so on.

References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

References to interfaces can encompass a physical port or portion of a physical port, one or more wavelengths of a wavelength multiplexed interface, one or more time slots of a time division multiplexed interface, one or more packets or connections at a packet based or connection based interface and so on.

References to layers can encompass optical layers, electrical layers, optical transport network (OTN) layers, packet layers and so on, and are not intended to exclude the possibility of having multiple different technologies within the same layer.

INTRODUCTION

By way of introduction to the embodiments, some issues with conventional designs will be explained. Path computation can encompass either off-line computation during path provisioning or on-line during dynamic routing, or at both times. Both can be complex tasks and sometime it is not enough to select the shortest path to maximize the network resources usage and reduce capex (capital expenditure). Instead longer paths are selected in certain traffic conditions because the performance in terms of resource optimization is better than always using just the shortest available path.

Path computation is needed in many different types of network. An example is the Internet, which is a conglomeration of Autonomous Systems (AS) or domains that define the administrative authority and the routing policies of different organizations. These domains consist of routers that run Interior Gateway Protocols (IGPs) such as Routing Information Protocol (RIP), Enhanced Interior Gateway Routing Protocol (EIGRP), Open Shortest Path First (OSPF), and Intermediate System-to-Intermediate System (IS-IS) within their boundaries. Neighbouring domains are interconnected via an Exterior Gateway Protocol (EGP); the current Internet standard EGP is the Border Gateway Protocol Version 4 (BGP-4) defined in RFC 4271.

Exterior routing protocols were created to control the expansion of routing tables and to provide a more structured view of the Internet by segregating it into separate administrations, or domains, each with their own independent routing policies and unique IGPs.

These routing protocols define how routers determine their 'map' of the network and from which they can compute the shortest path to a destination, allowing routing to be a largely automatic process. However, the shortest path is not always the fastest or the best. Traffic Engineering (TE) is the process where data is routed through the network according to the availability of resources and the current and expected traffic. The required quality of service (QoS) can also be factored into this process. Traffic Engineering may be under the control of operators whereby they monitor the state of the network and route the traffic, or provision additional resources, to compensate for problems as they arise. Alternatively, Traffic Engineering may be automated. Traffic Engineering helps the network provider make the best use of available resources, spreading the load over the layer 2 links, and allowing some links to be reserved for certain classes of traffic or for particular customers.

Technologies such as Multi-Protocol Label Switching (MPLS) and its extensions (i.e. GMPLS, T-MPLS), provide efficient TE solutions within a single domain thanks to their connection oriented nature, to minimize costs.

Efficient path computation for multi layer networks having hybrid nodes would be helped if all information regarding the status of each internal link should be provided (such as total bandwidth, available bandwidth, granularity etc). One problem is that packet LSPs are bandwidth variable in a continuous range of values, while circuit bandwidth (e.g. node with lambda switching capability) varies stepwise according to fixed values (e.g. 2.5 Gbps, 10 Gbps, etc.). Hence efficient grooming of packet traffic in a circuit LSP should be performed taking into account such features.

In literature and standardization the problem to define the information to model internal links of hybrid node is still an open issue. If too much information is advertised by routing protocols, the scalability of the control plane could be compromised as the advertisement messages take up too much bandwidth and clog or slow down the control plane.

Hence there remains a need for some way of advertising information that is scalable and efficient for the particular case of internal links where there is adaptation between different protocols, such as adaptation between PSC and circuit switching capability (e.g. LSC). The above mentioned IETF proposed Interface Adaptation Capability Descriptor (IACD) TLV has some generic information to describe the internal links of a generic hybrid node. However, this generic description doesn't enable an efficient resource usage of internal links. Instead, or as well, according to embodiments of the invention, the link advertisement can now be arranged to carry an indication of a maximum bandwidth available for a single new traffic flow on any one of the internal links. Examples of how to implement this will now be described in more detail.

FEATURES OF EMBODIMENTS

Some embodiments involve a method to provide additional internal links' bandwidth information of a GMPLS hybrid node in order to optimize the resource usage while performing layer adaptation. Moreover, the proposed solutions can be scalable in terms of amount to information to be advertised by control plane protocols. Particularly, the solutions can address the adaptation between packet technologies, that consider LSPs with continuous BW (Bandwidth) values, and optical technologies that consider LSPs with fixed BW slots.

A control plane hybrid model is proposed where some information and operation are performed at control plane level (network) and other information and operation are performed by local control of the node.

This is obtained by a suitable usage of IACD fields of routing protocols (OSPF, IS-IS) that keep high scalability of the solution while advertise all information to be used by Path Computation Element (PCE) for an efficient Multi-Layer path computation.

In at least some embodiments the internal links are modeled or represented by some or all of:

- aggregate bandwidth (maximum and available) which can enable the PCE to control the occupation of the node;
- maximum bandwidth of a single internal link that enables the PCE to groom the packet traffic within each internal link; and
- Total amount of protected bandwidth for LSPs on internal links which can help the PCE to carry out recovery path computation.

On the basis of such information the network control plane can select the node and the external links for PSC and LSC, while the specific choice of the internal link is left to the local control of the node. Such local control works in co-operation with network control plane and it is able to select the suitable specific internal links' resources in order to avoid bandwidth wasting. Particularly, it tries, if possible, to re-use the partially used links, before using a free one.

Embodiments can provide a network node having: a plurality of external connections interconnected by a switching matrix and operable according to a first protocol; and a plurality of external connections interconnected by a switching matrix and operable according to a second protocol; a number of internal links between the switching matrices operable according to the first and second protocols; an adaptation function arranged to adapt the traffic flow between the switching matrices; a controller arranged to generate and send a link advertisement comprising the following network node operational parameters: maximum bandwidth of all the internal links between external connections; maximum bandwidth of a traffic flow for switching onto one of the internal links.

The link advertisement further may further comprise at least one of the following: minimum bandwidth of a traffic flow for switching onto one of the internal links; protected bandwidth of all the internal links between external connections; maximum bandwidth of traffic flow at a number of priority levels.

In some embodiments, the first protocol uses a variable bandwidth packet switched connection to communicate a traffic flow; and the second protocol uses a fixed bandwidth circuit switched connection to communicate the traffic flow.

In some embodiments the traffic flow may comprise label switched paths, and the fixed bandwidth circuit switched connection may be a lambda switched path.

The link advertisement may be sent using the GMPLS control plane protocol. The controller may be further arranged to allocate a new traffic flow to one of the internal links in response to a new connection request whilst minimising the number of internal links utilized.

The controller may allocate the new traffic flow to an internal link which is supporting another traffic flow where the aggregated bandwidth of the two traffic flows do not exceed the maximum bandwidth of the internal link.

In some embodiments a path computation element comprising a control plane interface and controller arranged to receive link advertisements from network nodes and to issue new connection requests to the network nodes, wherein the link advertisements comprise from at least one network node the following operational parameters: maximum bandwidth of all the internal links between external connections; maximum bandwidth of a traffic flow for switching onto one of the internal links.

In an embodiment the link advertisement also comprises minimum bandwidth of a traffic flow for switching onto one of the internal links. The link advertisement and new connection requests may be communicated using the GMPLS control plane protocol.

There are also provided corresponding methods and computer program products for carrying out some or all of the method steps.

The controller can be arranged to determine when all the internal links are occupied, partially or completely, and to send an updated link advertisement with an updated indication of the maximum bandwidth currently available on any one of the internal links. This can help the PCE to maintain an up to date model and to avoid selecting paths via hybrid nodes if their internal links have insufficient maximum bandwidth for the new traffic flow.

The controller can be arranged such that the link advertisement also comprises an indication of a maximum aggregate bandwidth of the internal links. This can help enable the PCE to maintain its model and to determine a degree of congestion of internal links of a node.

The controller can be arranged such that the link advertisement does not identify all the internal links individually and their bandwidths. This can enable the link advertisements to be smaller, and thus enhance scalability and speed up operation of the PCE.

The controller can be arranged such that the link advertisement further comprises an indication of at least one of the following: a minimum bandwidth allocable to a traffic flow for switching onto one of the internal links; an aggregated protected bandwidth of all the internal links; a proportion of the bandwidth of the internal links currently occupied, and a maximum bandwidth of traffic flow at a number of priority levels. Such information can be particularly useful to the PCE without unduly adding to the sending and processing burden of the link advertisements.

The first switching matrix can be arranged to use the first protocol to switch a variable bandwidth packet switched connection to communicate a traffic flow; and a second switching matrix can be arranged to use the second protocol to switch a fixed bandwidth circuit switched connection to communicate the traffic flow.

The traffic flows can comprise label switched paths, and the fixed bandwidth circuit switched connection can comprise a wavelength switched path. The controller can be arranged to use a GMPLS control plane protocol to send the link advertisement. These are commonly used, but the features are also applicable to other types of paths and other protocols for sending the link advertisements.

The controller can be arranged such that the indication of a protected bandwidth is a variable parameter indicating an aggregate of protected bandwidth currently available on all the internal links.

FIGS. 1-4, Embodiments of Network, Node and Path Computation Elements

FIG. 1 shows a schematic view of a network having features as follows. A number of nodes 10 are coupled together by communications links. At least some of the nodes are hybrid nodes. When a request for a new traffic flow is received, a path computation element 100 is used to determine a path via a number of the nodes. The path computation element needs to know which nodes have bandwidth available, so that the path can avoid bottlenecks, and select paths which are not unnecessarily long. Therefore the path computation element receives link advertisements from the nodes indicating their connectivity and available bandwidths on the links to other nodes. Once the path is selected, the path computation element sends out information to the nodes to enable the nodes to allocate bandwidth to set up the selected path.

Figure 2:
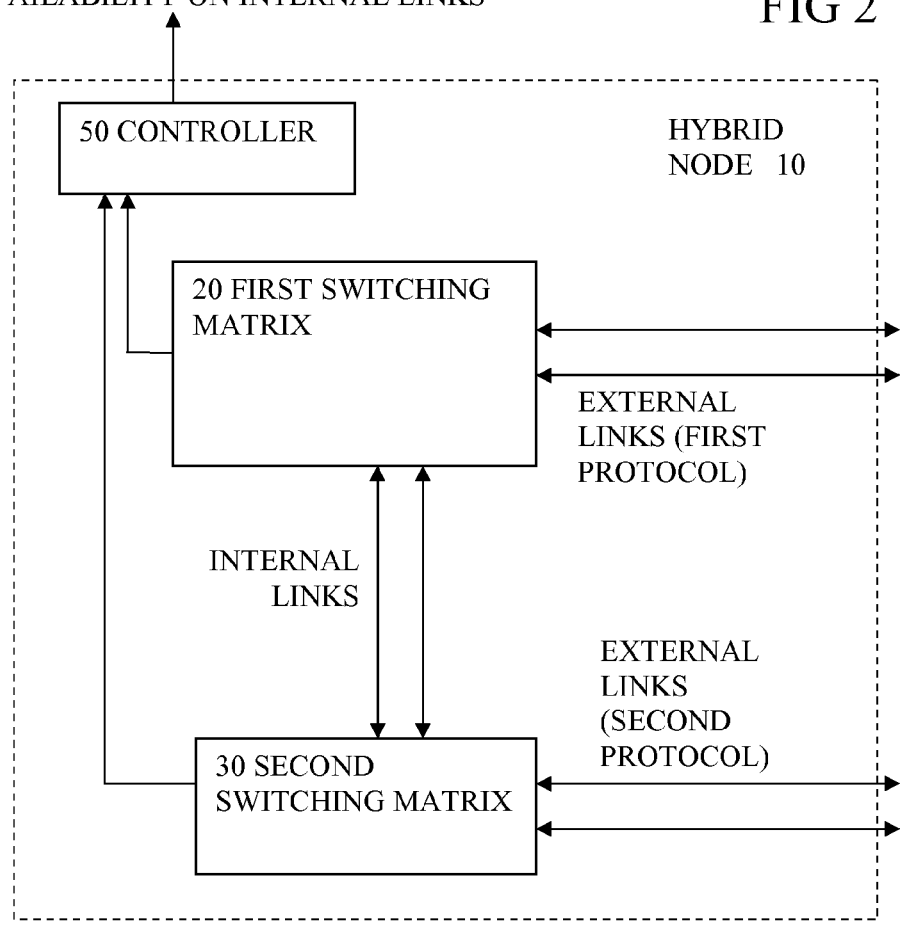
FIG. 2 shows a schematic view of a hybrid node according to an embodiment.

FIG. 2 shows a schematic view of a hybrid node 10 for use in the network of FIG. 1 for example. A first switching matrix 20 has external links to other nodes using a first protocol, and is operable to switch traffic flows using the first protocol between these external links or between the external links and internal links. The internal links are coupled to a second switching matrix 30 which uses a second protocol, and has external links to other nodes. Again the second switching matrix is operable to switch traffic flows using the second protocol between the external links or between the external links and the internal links. If the internal links are used, then there must be a protocol adaptation at one or other end of the internal links. A controller 50 is provided for generating and sending out link advertisements showing summarized information about bandwidth availability on internal links, such as at least the maximum bandwidth of any one of the internal links. As more bandwidth on the internal links is occupied, then all the internal links can become at least partially occupied. Then the maximum bandwidth available on any one of the internal links can change, and an updated link advertisement can be sent out. It is useful for the path computation element to know this information so that it does not try to set up paths through the internal links of this node which need more than the maximum bandwidth available on a single internal link, if the individual paths are not to be split to use more than one of the internal links. The path computation element does not need to know all the details of which internal link has most bandwidth, or to know all the bandwidths of all the internal links, if the node itself controls the selection of which path uses which of the internal links. Thus the amount of information in the link advertisement can be limited, to maintain scalability as the number of nodes in the network increases from tens to hundreds or more for example.

Figure 3:
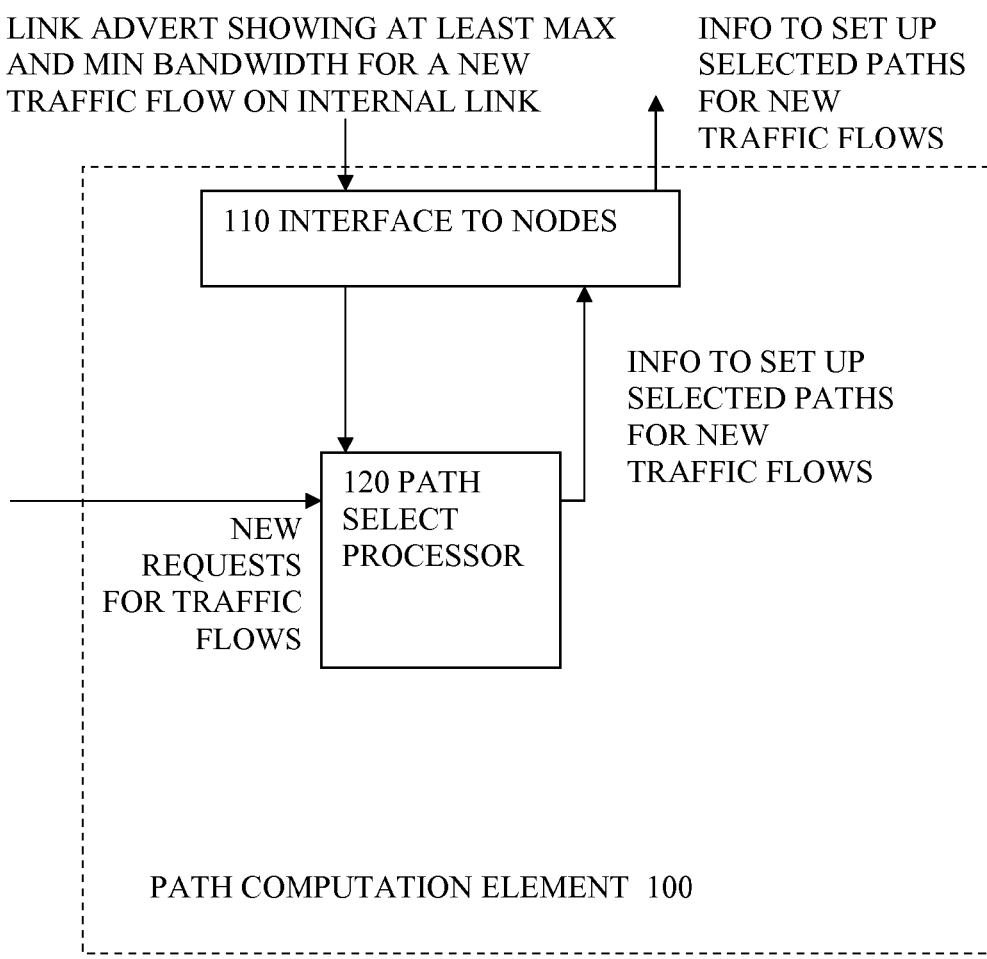
FIG. 3 shows a schematic view of a path computation element according to an embodiment.

FIG. 3 shows an example of a path computation element 100 according to an embodiment of the invention. An interface 110 is provided to the nodes. This receives link adverts showing at least a maximum and minimum bandwidth on any one internal link, from the hybrid nodes. A path select processor 120 is provided to receive the link adverts from the different nodes, and to determine available bandwidths between nodes and through internal links of nodes. Then when a new request for a traffic flow is received, the path select processor can select a path through the nodes according to which of the nodes has available bandwidth. This can be implemented in various ways, for example by maintaining a model of the network topology and bandwidth information, and following a known path computation algorithm using the model. Once the path is selected, information can be sent to the nodes along the path to set up the path by allocating bandwidth at each node accordingly.

Figure 4:
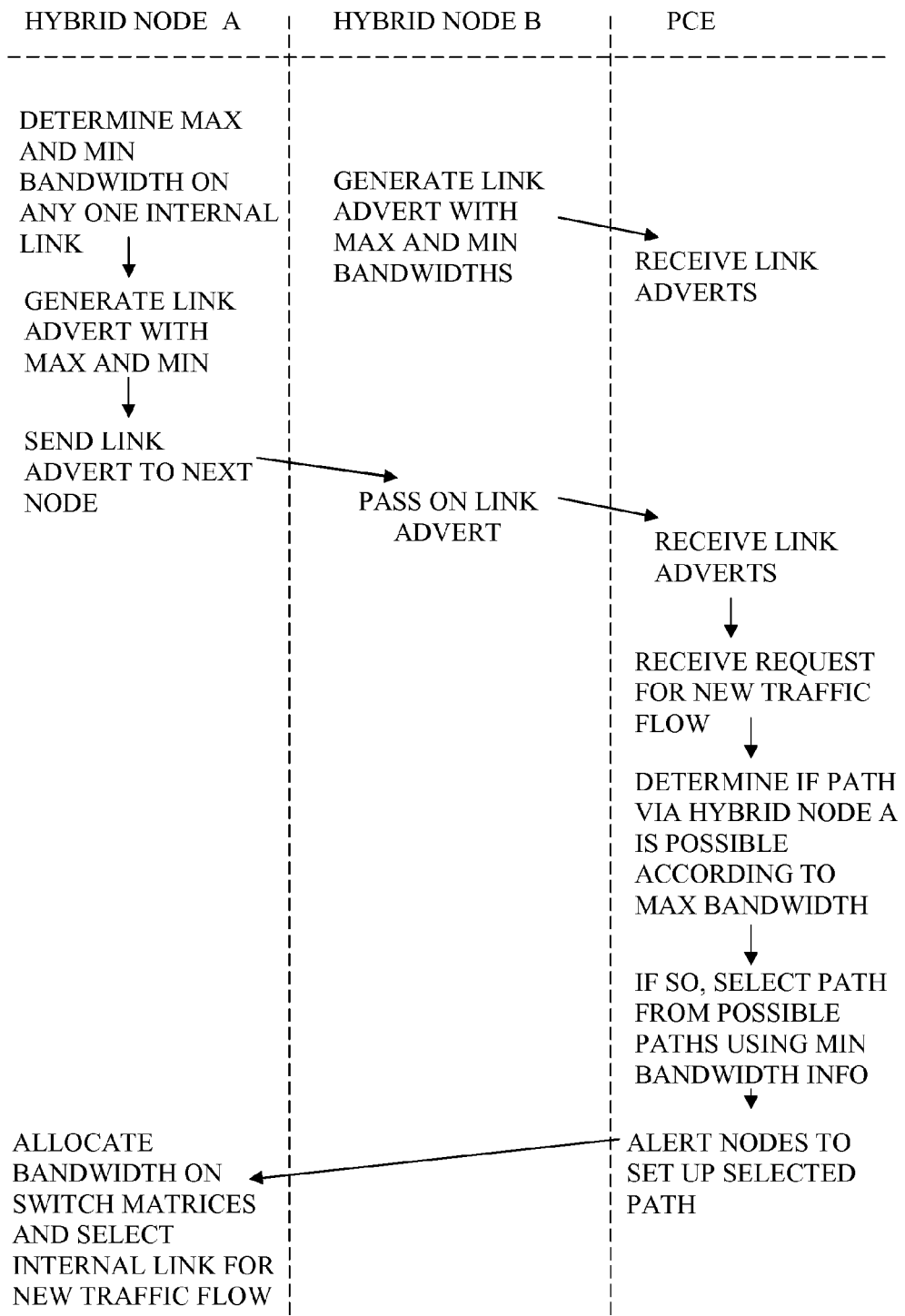
FIG. 4 shows a time chart of operations according to embodiments.

FIG. 4 shows a time chart of actions or events of different parts of a network, according to an embodiment. Time flows down the figure. A left hand column shows actions of a first hybrid node A, a middle column shows actions of a second hybrid node B, and the right hand column shows actions of a path computation element 100.

As shown, hybrid node A determines a maximum bandwidth on any one internal link and generates a link advertisement having this value. Optionally other values may be determined and included in the link advertisement, such as a proportion of the total bandwidth currently occupied, or other values as described below. The link advertisement is sent to the PCE, either directly or via other nodes as shown by the step of passing on the link advert by hybrid node B. Hybrid node B can also generate its own link advertisements and send these to the PCE.

The PCE receives the link advertisements and can use the information they contain when a request for a new traffic flow is received. For example, the PCE can determine if a path via hybrid node A or B using their internal links is possible according to the maximum bandwidth information received, and according to the bandwidth of the requested traffic flow. If so, then the PCE selects a path using the minimum bandwidth information according to any suitable path computation algorithm, e.g. to avoid wasteful use of links where the minimum bandwidth is much more than the bandwidth needed, to balance a need for short paths using a minimum number of nodes, and a need for the paths to avoid bottlenecks or congested nodes so that the amount of congestion is reasonably evenly spread between all the nodes. There are many possible known algorithms for this, which need not be discussed in more detail here. Once a path is selected, the PCE can alert the nodes along the selected path to cause them to set up the path and allocate some of their bandwidth to the path. In the example shown, hybrid node A is on the selected path and allocates bandwidth on its switch matrices and selects an internal link for the new traffic flow.

Figure 5:
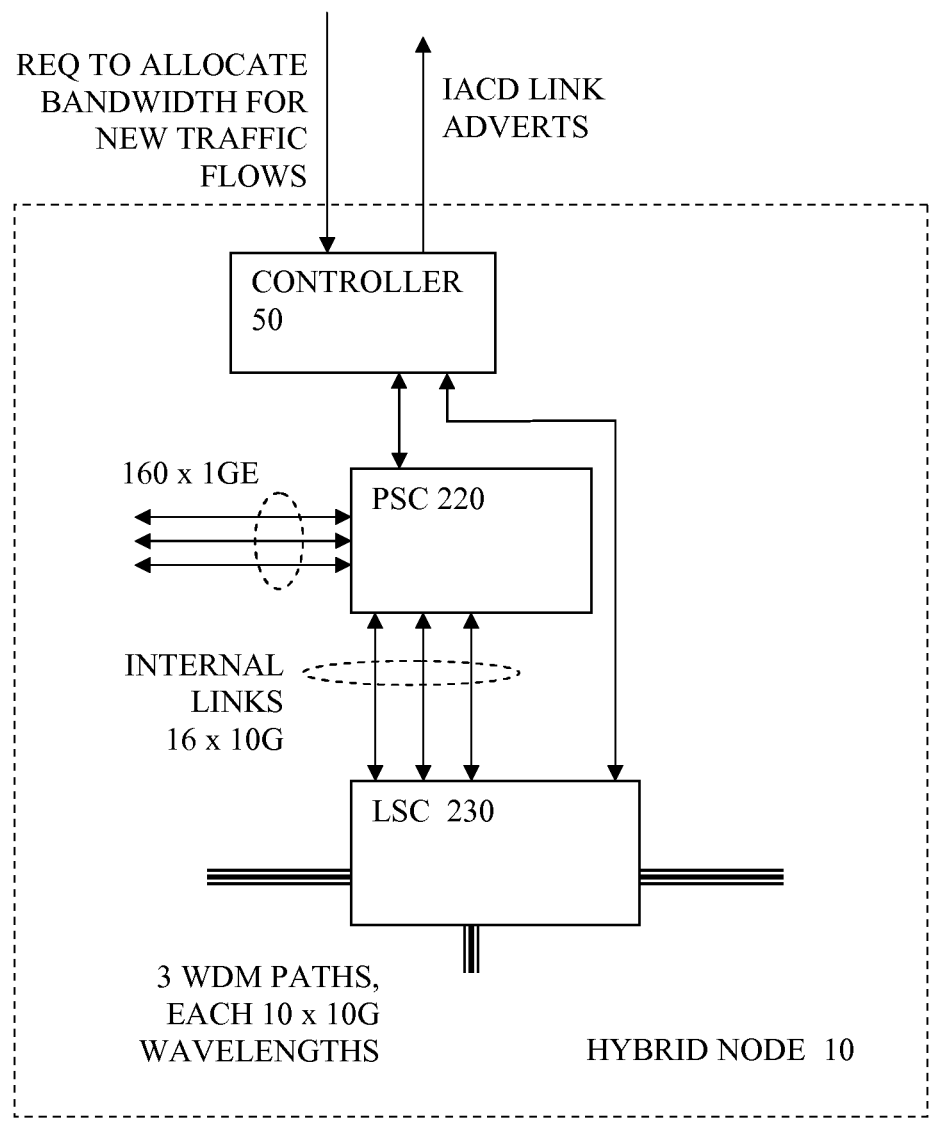
FIG. 5 shows schematic view of a hybrid node according to another embodiment.
Figures 7, 8:
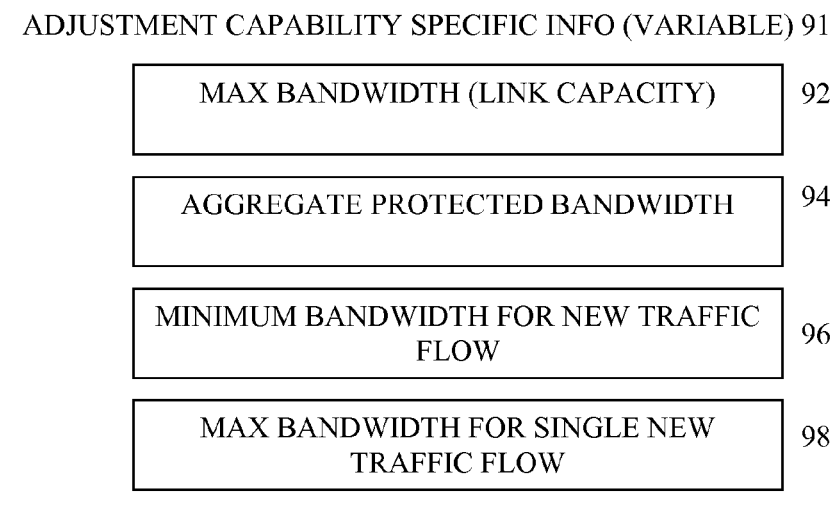
FIG. 7 shows a view of part of a link advertisement including a maximum bandwidth for a single new traffic flow according to an embodiment.
FIG. 8 shows a view of a link advertisement in the form of an Interface Adaptation Capability Descriptor IACD, according to an embodiment.

FIGS. 5, 6, 7 Hybrid Node According to Another Embodiment

FIG. 5 shows another example of a hybrid node 10 according to another embodiment. For the sake of simplicity and without any lack of generality, this example shows a Packet-Opto hybrid node that performs adaptation between MPLS-TP technology (i.e. PSC layer) and WSON (i.e. LSC layer). The Packet-Opto node is a hybrid node composed by a double switching capability, that is, a Packet Switching Capability (PSC 220) and Lambda Switching Capability (LSC 230). The optical layer is constituted by an OEO ROADM (Optical-Electrical-Optical Regen-Optical-Add-Drop-Multiplexer), in which the routing of the wavelength signals coming from the transport network is performed, without any limitation due to physical impairments. As a matter of fact, thanks to the OEO conversion, the node is considered to be both colorless and directionless. A controller 50 is shown which can be implemented by a conventional processor and appropriate software. This controller can generate a link advertisement as shown in more detail in FIG. 6, 7 or 8.

In the example shown, the external links for the PSC include 160×1GE (Gigabit Ethernet) links to two or more neighbouring nodes or local data sources or data sinks. The internal links include 16×10 Gbit/s links and the external links for the LSC include 3 WDM paths each having 10 wavelengths each with a bandwidth of 10 Gbits/s.

FIG. 6, Example of a Link Advertisement in the Form of an IACD Sub-TLV

An efficient multi-layer path computation makes use of detailed knowledge of internal links' capabilities of hybrid nodes. According to IETF standards see ref [2], such information is carried in the IACD sub-TLV of a TE Link part of GMPLS routing protocols (OSPF-TE, ISIS-TE). FIG. 6 shows an example having a fixed format of 9 lines each of 32 bits followed by a variable part containing adjustment capability specific information about the internal links. The fixed format part follows conventional practice and in this example has a first line having a lower SC part, a lower encoding part, an upper SC part, and an upper encoding part. The next 8 lines each have an indication of a maximum LSP bandwidth available at a given priority level, from priority level 0 to priority level 7. Other formats and information in the link advertisements can be envisaged. Various ways of implementing the variable length part with information about the internal links can be envisaged.

FIG. 7 Example of Adjustment Capability Specific Info in the Link Advertisement

In this example shown in FIG. 7, the link advertisement is intended to carry limited information to enable the PCE to model the hybrid node and its representation in routing protocols (OSPF) for GMPLS control plane in order to be scalable and efficient. Specifically the internal links are modeled by the PCE with some or all of the following information:

Total bandwidth of all internal links as aggregated;
Max Bandwidth for a single new traffic flow.
Available bandwidth of all internal links as aggregated.

Such information can be advertised by the variable part of a single IACD as shown in FIG. 6 and can be associated with all the N internal links connecting the PSC and the LSC switching elements of the Packet-Opto node. In other words, all the internal links can be represented and advertised as if they were a single internal link, improving the scalability of routing protocol's signaling.

As shown in FIG. 6, the "Max LSP bandwidth at priority X" fields may vary as LSPs are set up and torn down (see ref [3]). Therefore, they represent the available bandwidth of all internal links. Moreover, the last field of IACD (i.e. the "Adjustment Capability-specific Information" field 91) is a variable length one, which is defined in order to leave the possibility for future addiction of technology-specific information associated to the adjustment capability.

In order to do that, an IACD extension is proposed, consisting in the definition of at least one new field and in the example shown, four new fields of the "Adjustment Capability-specific Information" (as shown in FIG. 7):

Max Bandwidth field 92, representing the total capacity of all the internal links as if they were a single internal link. It is assumed to be the global internal Capacity of the whole PSC-LSC adaptation.

Protected Bandwidth field 94, representing the total amount of bandwidth that is protected (i.e. the amount of bandwidth reserved for protected LSPs). As the previous one, this field refers to all the internal links as if they were a single internal link.

Minimum LSP Bandwidth field 96, representing the minimum amount of bandwidth that a LSP can have in order to be set on one of the internal links (the value can be also 0)

Maximum LSP Bandwidth field 98, representing the maximum amount of bandwidth that a LSP can have in order to be set on one of the internal links (i.e. the maximum bandwidth that is possible to accommodate on an internal link)

It would be possible to send all the detailed bandwidth and protection information for each internal link that physically compose the adaptation capability, but it would be not scalable at all. Therefore, the proposed link advertisement can be limited to information that is summarized and scalable, but allows a more efficient path computation.

More particularly:

Maximum LSP Bandwidth field 98 is a variable field which carries information about the max bandwidth allocable for an LSP on the internal link. If the internal link is modelled as the composition of N links and all the links are partially occupied, this field will indicate the higher available bandwidth that it is possible to accommodate. This field alone could be advertised. In other cases additional fields are advertised as follows. Aggregate Protected Bandwidth field 96 is a variable field which represents the maximum amount of bandwidth that can be protected. When the possibility to protect some LSPs is reduced because the node load has grown, this field indicates the maximum amount of bandwidth that can still be protected. The combination of fields 96 and 98 can help enable a PCE to efficiently compute paths. As an example, in an optical environment there can be a constraint also for the minimum LSP bandwidth (e.g. meaning that a whole wavelength will be allocated for a new LSP). Therefore, having the information of both fields can enable an efficient path computation.

Minimum LSP Bandwidth and Maximum Bandwidth are fixed fields 92 and 94. The information that they carry is flooded in the network and can enable better path computation, since they enable the percentage of nodes capacity currently occupied to be derived, thus enabling the PCE to avoid bottlenecks.

The described extensions allow a better path computation, with enough detailed information, while preserving the scalability. Particularly they provide a high-level evaluation of nodes loading in the network and of the internal bandwidth organization in hybrid nodes.

The variable bandwidth values are the ones considered in the IACD sub-TLV (i.e. Max BW at priority x). Moreover, it is notable that in some cases, the LSC layer performs the switching on a wavelength basis, and each internal link may have the same capacity as a wavelength, so that the whole lambda capacity is switched, meaning that a partially filled internal link can only be filled by a traffic flow to the same port of the LSC. Thus the Maximum LSP Bandwidth field can initially represent the wavelength bandwidth quantum (i.e. the bandwidth slot considered for the considered optical technology).

FIG. 8, a View of a Link Advertisement in the Form of an Interface Adaptation Capability Descriptor IACD In order to clarify those fields an example is shown in FIG. 8, where a Packet-Opto node with 16 internal links, each one with the capacity of 10 Gbps is represented. In this example 4 of those internal links are used to protect the other 12 ones (i.e. a 4:12 protection scheme is adopted). This means that in this example four of the internal links carry pre-emptable best effort traffic (4×10 Gbits/s) so that these links can protect the traffic of the other twelve internal links.

In the first nine lines of the IACD, the fields are as shown in FIG. 6, a first line having a lower SC part 82 with a value entered indicating a PSC, and a lower encoding part 84 has a value indicating a packet. An upper SC part 86 has a value indicating an LSC, and an upper encoding part 88 has a value indicating lambda for a wavelength. The next 8 lines each have an indication of a maximum LSP bandwidth available at a given priority level, from priority level 0 to priority level 7. An initial value is shown in boxes 87 and 89 as being 40 GBits/s.

Each TE Link TLV of the considered node will carry the global IACD advertised for the internal links, with the following values:

Max Bandwidth field 92=160 Gbps (16 links, each one with capacity of 10 G)

Protected Bandwidth field 94=120 Gbps (12 internal links, each one with capacity of 10 Gbps being protected, so aggregate is 120 Gbps)

Minimum LSP Bandwidth field 96=0 Gbps (no constraints for tributary PSC LSPs)

Maximum LSP Bandwidth field 98=10 Gbps (the total capacity is composed by 16 links, each one with capacity of 10 Gbps, so an LSP with bandwidth higher than 10 Gbps can not be accommodated)

If a protected connection of 8 Gbps and a not protected connection of 7 Gbps would be set, then the Max BW at priority 7 (i.e. the field representing the available BW for protected connections) will become 120-8=112 Gbps instead of 120 Gbps and the Max BW at priority 0 (i.e. the field representing the available BW for not protected connections) will become 40-7=33 Gbps instead of 40 Gbps.

The additional BW information described above, is managed by the control plane and allows the PCE to perform an efficient multi-layer path computation, through a more detailed knowledge of the resource status. Additionally, the local control of the node, which works in co-operation with PCE, tries to satisfy the connection requests minimizing the number of internal links by fulfilling them (i.e. by avoiding bandwidth wasting).

As a matter of fact, the node policy tries, if possible, to re-use the partially used links before using a free one. In other words, the node will fill as much as possible the wavelength quantum by grooming as many PSC LSPs as it can in order to reach the "Max LSP BW" value.

In order to clarify this mechanism, a further example will be explained. If a request for an 8 Gbps connection comes, it will be served using the first available internal links (for example internal links IntLnka), that now will have 2 Gbps free.

If a second request for a 7 Gbps connection comes, instead of accommodating the request on a new internal link, the node local control tries to serve it on IntLnka, but there is not enough available bandwidth (8+7=15 Gbps>10 Gbps). Hence a second internal link is used (for example internal link IntLnkb), that now will have 3 Gbps free. If a third request for a 3 Gbps connection arrives, instead of accommodating the request on a new internal link, the node local control tries to serve it on IntLnka, but there is not enough available bandwidth (8+3=11 Gbps>10 Gbps). Hence, it serves it on IntLnkb fulfilling it (7+3=10 Gbps).

The efficient interworking between the control plane and the local control of a hybrid node, as well as the additional internal links' bandwidth information provided by the proposed solution, can allow a significant improvement of both the resource utilization and the efficiency of the path computation with no significant increase of flooded information.

Figure 9:
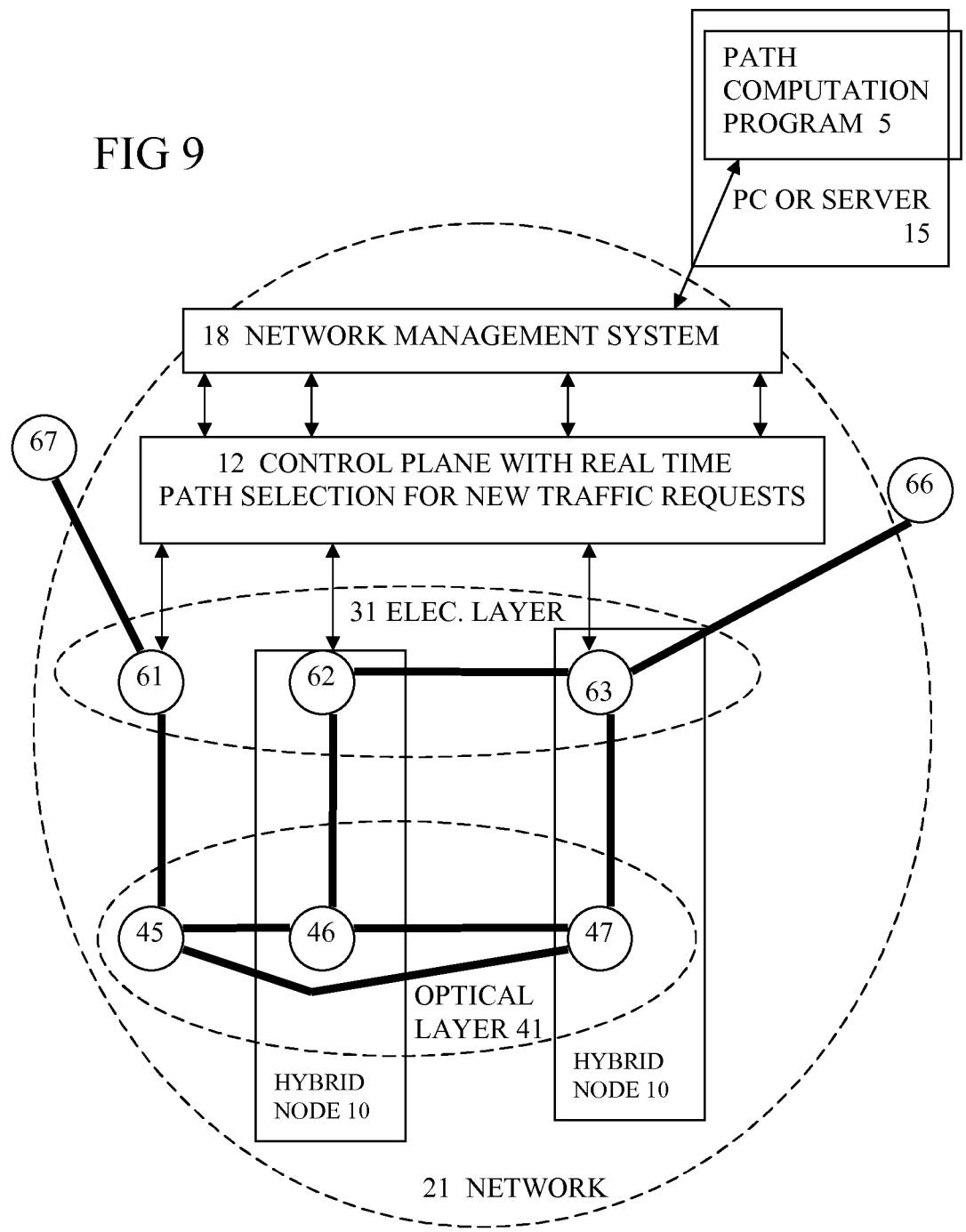
FIG. 9 shows a schematic view of parts of a communications network including a hybrid node according to an embodiment.

FIG. 9 Overview of Network

FIG. 9 shows an overview of a network 21 having a number of switching nodes in an electrical layer 31 and an optical layer 41. A network management system 18 is coupled to a control plane 12. This control plane can be implemented in a centralized or distributed manner as would be known to those skilled in the art. The control plane can undertake path selection in the form of dynamic routing in real time for new traffic requests. The control plane is coupled to switching nodes which can be in the electrical layer 31 or the optical layer 41. Some nodes can be hybrid nodes 10, having switching in both layers. A number of links between nodes are shown, a typical network would have many more. A traffic requester 67 outside the network could be an interface from a corporate intranet, or a user terminal for example, requesting traffic from a traffic source 67 such as a remote server. The request can be managed by the network management system, or can be handled directly by the ingress node, in this case switch 61. There are a number of possible paths between the source 67 and the destination 66, passing through electrical switches 61, 62 and 63, and optical switches 45, 46 and 47. The electrical switches can comprise packet based switches or connection oriented switches for example. Hence the path computation can be extended to cover the packet layer and thus cover more than two layers for example.

Path computation can be carried out either dynamically by a path computation element included in the control plane 12, or off line by an off line path computation program 5 shown running on a computer PC 15 outside the network, and used either for path provisioning during network design before installation, or for determining how best to upgrade the network by providing new capacity. If the path computation is carried out externally to the ingress node, then the requesting entity or the ingress node needs to pass all the necessary information to the external part.

Figure 10:
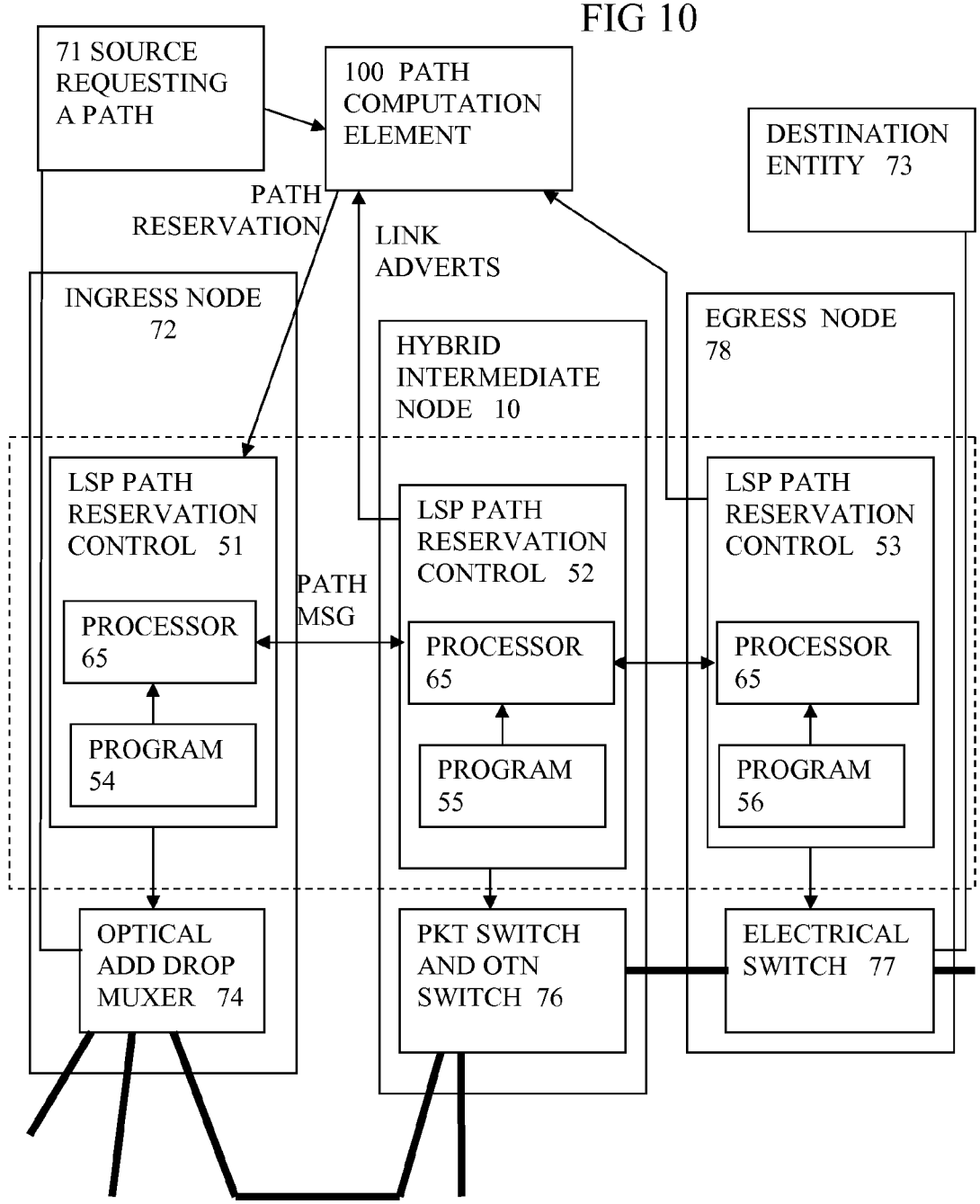
FIG. 10 shows schematic view of a hybrid node according to another embodiment.

FIG. 10, Alternative Network View

FIG. 10 shows a schematic view of some of the nodes in an optical network showing parts used to exchange messages to advertise information or set up paths. Three nodes are shown, there can be many more. An ingress node 72 has an LSR path reservation control part 51, which controls an add drop multiplexer part 74. The reservation control part can have a processor 65 and a store having a program 54 for execution by the processor 65. The program can enable the node to act as an ingress node, or in some cases, to act as an intermediate node for other paths started elsewhere. An intermediate node along the path is a hybrid intermediate node 10 and has its own controller in the form of an LSR path reservation control part 52, which controls a packet switch and OTN switch 76. This can be an example of a PSC and an LSC coupled by multiple internal links. Again, the reservation control part can have a processor 65 and a store having a program 55 for execution by the processor 65. The program can enable the node to act as an intermediate node. If the intermediate node had add drop capabilities, then the program could be chosen to make the node act as an ingress or egress node for other paths.

An egress node 78 has its own LSP path reservation control part 53, which controls an electrical switch 77. Again, the reservation control part can have a processor 65 and a store having a program 56 for execution by the processor 65. The program can enable the node to act as an egress node for the path shown, or as an ingress or intermediate node for other paths. A source entity 71 requesting a path is shown, as a source of the traffic for which the new path is needed, through the network to a destination entity 73. A path computation element 100 can be in the form of a server, coupled to receive a traffic request from source part 71. The path computation part then selects a path and feeds the selected path to the ingress node 72 for setting up the path as described earlier. Link advertisements can be sent to the path computation element from the control parts of each node. If the path computation part is not in the ingress node, but is a remotely located part, optionally centralized to be used by many different nodes, then a communications protocol between the source of the traffic request and the path computation part is needed. This protocol can indicate what information in what format is needed by the path computation part, and what information and what format is to be used for the output of the path list to the ingress node. RFC 4657 is a known example of such a protocol, for use with path computation parts corresponding to the known standard RFC 4655.

The processors of each node can pass messages to each other to advertise information to be used by the path computation server, following known protocols, or to control power up of parts of the nodes. Optical links are shown for carrying the traffic between the nodes, and an electrical link is shown between the intermediate hybrid node and the egress node. Also, a connection is shown between the control parts of the nodes for passing messages to reserve the path if RSVP is used for example. This connection can in principle use either the same or different physical links to those used by the traffic between nodes. The optical links for the traffic can have a multiplex structure of trib slots. A path can use one or more of these trib slots, and a reservation procedure needs to indicate which of these trib slots is reserved.

In operation, the path computation element can compute paths using a model of the network. This is one way to implement path computation, others can be envisaged. A model of the network can be provided or built up, having a separate virtual link for each choice of traffic aggregation, each port or sub-port and so on, including internal links of hybrid nodes. Also, current information on available capacity and costs can be assigned to each link. This can involve finding information from the nodes, or predetermined or predicted information can be assigned. There can be weighting of links according to congestion level and other criteria.

When a traffic request is received, if the request has a specified bandwidth and quality of service, then it may be appropriate to allow only links which have at least that bandwidth and quality of service available. The quality of service might be expressed in terms of reliability, availability of recovery by protection or restoration, delay parameters such as maximum delay or delay variation, and so on. Then a graph search algorithm such as Dijkstra or other known algorithm can be applied to compare the costs of alternative links to find a lowest cost path to nodes successively further away from a starting node, until the destination node is reached. Other algorithms can include peer to peer type routing algorithms for example.

The selected lowest cost path through the virtual links of the model, is converted into a path list in terms of actual nodes and ports and aggregation information suitable for the actual network. This path can now be set up in the network, for example by sending the path information to the ingress node for it to send messages along the path as described above for the RSVP protocol. This can involve sending a first message to the nodes requesting they reserve resources, and then a second message is returned from the egress node requesting the reserved resources be used to set up the path. Of course this can be implemented in other ways using other protocols.

Figure 11:
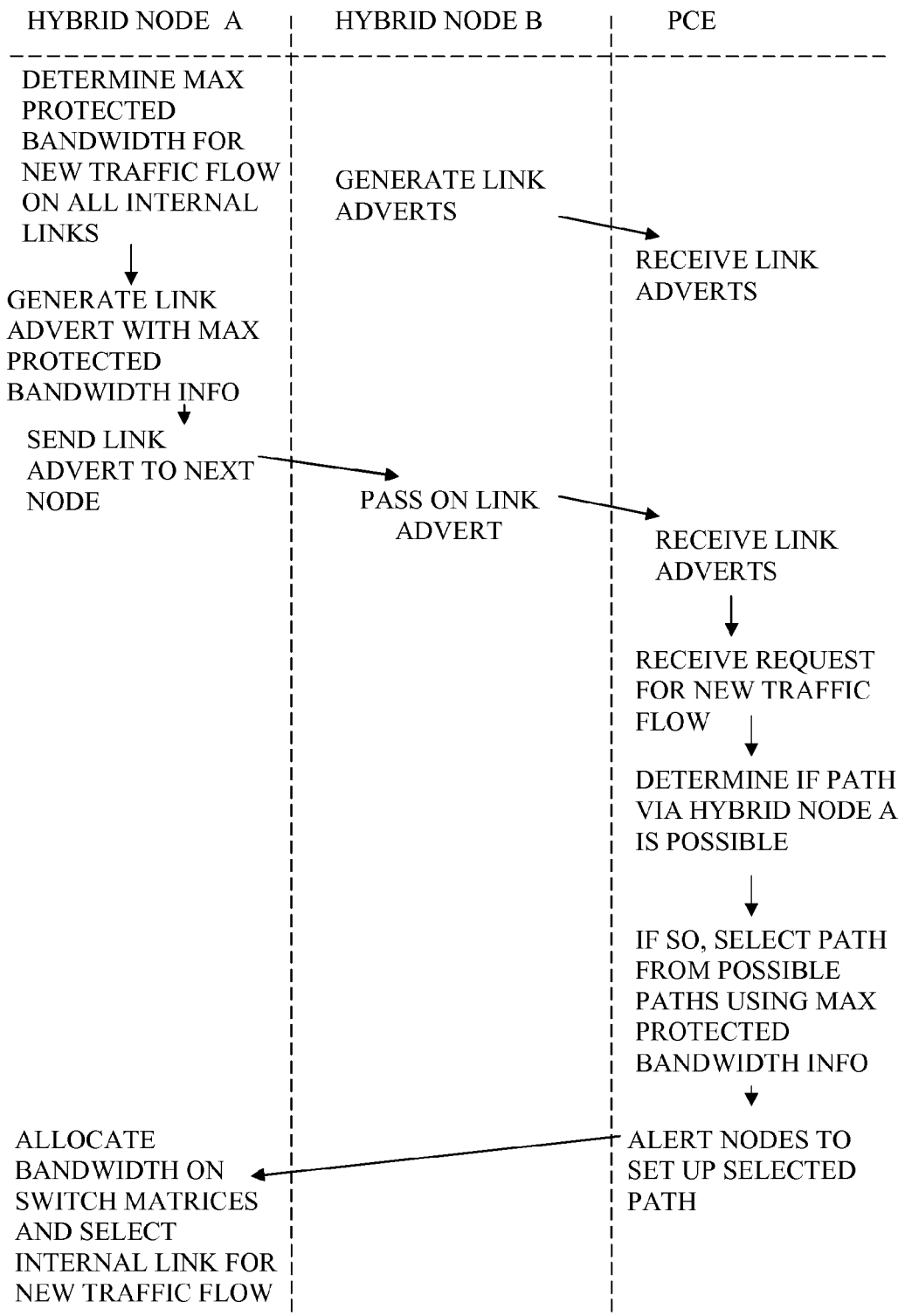
FIGS. 11 and 12 show time charts of operations according to other aspects, where the link indicates a maximum aggregate protected bandwidth available for new traffic flows on all of the internal links, or an indication of a maximum aggregate bandwidth of all the internal links.
Figure 12:
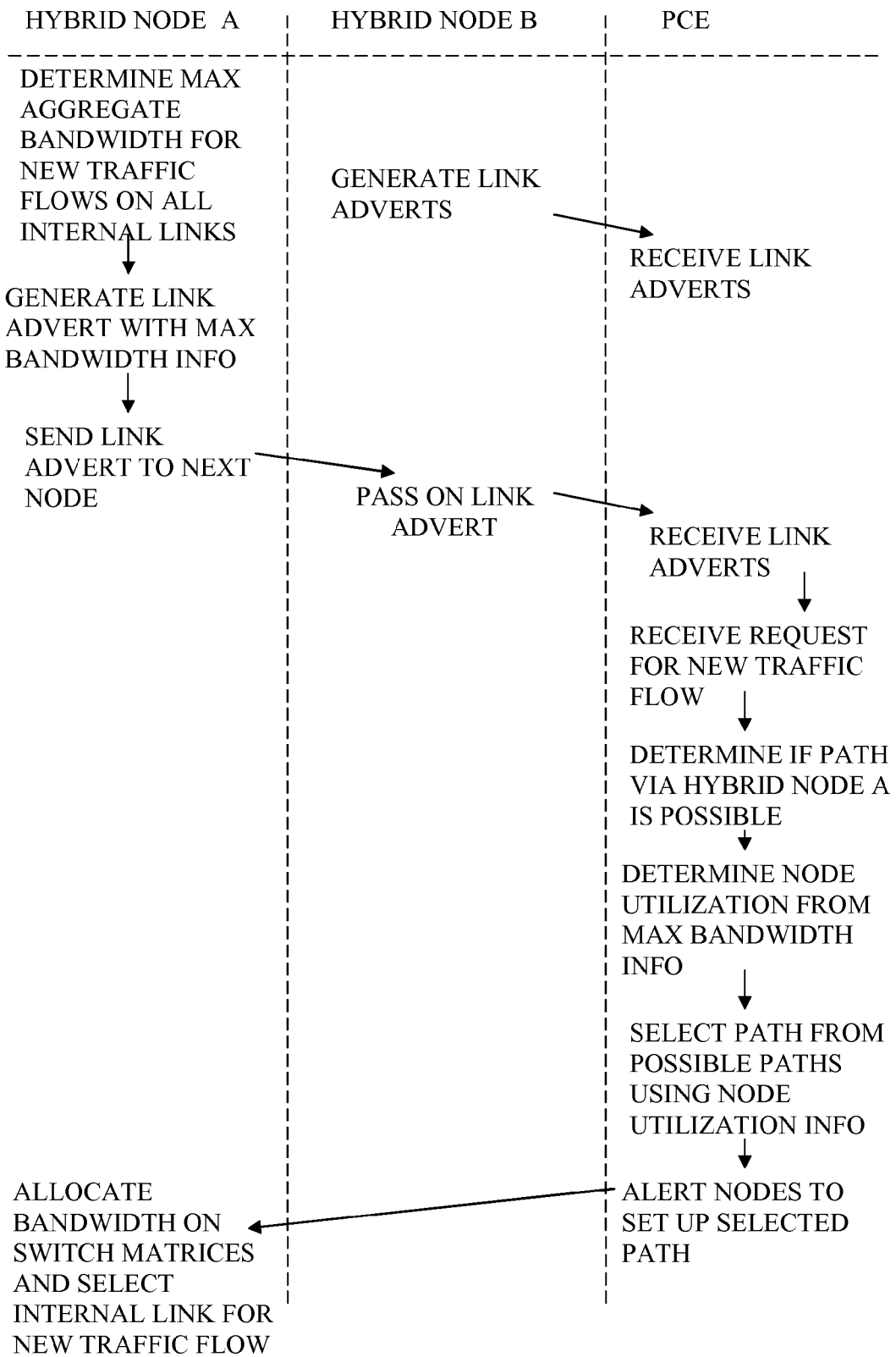

FIGS. 11 and 12, other embodiments:

FIGS. 11 and 12 show time charts similar to that of FIG. 4, but for other aspects of the invention with different indications in the link advertisements.

As shown in FIG. 11, hybrid node A determines a maximum protected bandwidth currently available on any one internal link and generates a link advertisement having this value. Optionally other values may be determined and included in the link advertisement, such as a proportion of the total bandwidth currently occupied, or other values as described below. The link advertisement is sent to the PCE, either directly or via other nodes as shown by the step of passing on the link advert by hybrid node B. Hybrid node B can also generate its own link advertisements and send these to the PCE. The PCE receives the link advertisements and can use the information they contain when a request for a new traffic flow is received. For example, the PCE can determine if a path via hybrid node A or B using their internal links is possible according to the bandwidth of the requested traffic flow. If so, then the PCE selects a path using the maximum protected bandwidth information according to any suitable path computation algorithm, e.g. in routing protected traffic, or in ensuring there is still some protected bandwidth available after routing un protected traffic or to balance a need for short paths using a minimum number of nodes, and a need for the paths to avoid bottlenecks or congested nodes so that the amount of congestion is reasonably evenly spread between all the nodes. Once a path is selected, the PCE can alert the nodes along the selected path to cause them to set up the path and allocate some of their bandwidth to the path. In the example shown, hybrid node A is on the selected path and allocates bandwidth on its switch matrices and selects an internal link for the new traffic flow.

FIG. 12 shows a similar time chart, in this case, the hybrid node determines the maximum aggregate bandwidth on all internal links. Optionally other values may be determined and included in the link advertisement. The link advertisement containing the maximum aggregate bandwidth information is sent to the PCE, either directly or via other nodes as shown by the step of passing on the link advert by hybrid node B. Hybrid node B can also generate its own link advertisements and send these to the PCE.

The PCE receives the link advertisements and can use the information they contain when a request for a new traffic flow is received. Node utilization levels can be determined from the maximum bandwidth information, and the path computation can therefore be constrained to avoid using more congested nodes if possible. As before, once a path is selected, the PCE can alert the nodes along the selected path to cause them to set up the path and allocate some of their bandwidth to the path.

At least some of the embodiments can provide one or more of the following effects. Resource optimization can take into account knowledge of internal links' bandwidth information. Efficient multi-layer routing is enabled since more information about the internal links between the layers is provided to the PCE.

Scalability can be preserved because all the adaptation information is managed as a global one (i.e. a single IACD is considered, carrying the global bandwidth information of all internal links as they would be a single internal link). Therefore, the amount of information to be advertised is low with respect to the amount of internal links of the hybrid node and need not be significantly affected by future increases in numbers of internal connections.

Comparing the "Max Bandwidth" field of the proposed extension with the "Max Bandwidth at priority x" fields of IACD, means it is possible for the PCE to obtain the percentage of utilization of the internal links, that can be used as an additional constraint for the path computation.

Other variations and embodiments can be envisaged within the claims.

REFERENCES

[1] RFC 3945—"Generalized Multi-Protocol Label Switching (GMPLS) Architecture", October 2004
[2] draft-ietf-ccamp-gmpls-min-extensions-12.txt, "Generalized Multi-Protocol Label Switching (GMPLS) Protocol Extensions for Multi-Layer and Multi-Region Networks (MLN/MRN)", Expiration date: Aug. 20, 2010
[3] RFC 4202—"Routing Extensions in Support of Generalized Multi-Protocol Label Switching (GMPLS)", October 2005

More details can be referenced in:
RFC 4203—"OSPF Extensions in Support of Generalized Multi-Protocol Label Switching (GMPLS)", October 2005
RFC 4206—"Label Switched Paths (LSP) Hierarchy with Generalized Multi-Protocol Label Switching (GMPLS) Traffic Engineering (TE)", October 2005
Draft-ietf-ccamp-lsp-hierarchy-bis-08.txt, "Procedures for Dynamically Signaled Hierarchical Label Switched Paths", Expiration date: August 272010
RFC 5339—"Evaluation of Existing GMPLS Protocols against Multi-Layer and Multi-Region Networks (MLN/MRN)", September 2008
RFC 5212—"Requirements for GMPLS-Based Multi-Region and Multi-Layer Networks (MRN/MLN)", July 2008
RFC 3630—"Traffic Engineering (TE) Extensions to OSPF Version 2", September 2003

The invention claimed is:

1. A node for a communications network, the node comprising:
    a plurality of external connections interconnected by a first switching matrix and operable according to a first protocol;
    a plurality of external connections interconnected by a second switching matrix and operable according to a second protocol;
    at least two internal links between the first and second switching matrices, each of the internal links being operable to pass a traffic flow between the first and second switching matrices and to adapt the traffic flow to suit the protocols of the switching matrices; and
    a controller operable to:
        determine, for each of the at least two internal links, a maximum bandwidth available for a single new traffic flow and a minimum bandwidth allocable for a single new traffic flow;
        determine, based on the minimum and maximum bandwidths for each of the at least two internal links, an overall maximum bandwidth on any one of the at least two internal links available for a single new traffic flow and an overall minimum bandwidth allocable on any one of the at least two internal links for a single new traffic flow; and generate and send to another part of the network a link advertisement comprising the overall maximum bandwidth available for a single new traffic flow on any one of the internal links, and the overall minimum bandwidth allocable to such a new traffic flow.

2. The node of claim 1, the controller operable to:
determine when all the internal links are occupied, partially or completely, and
send an updated link advertisement with an updated overall maximum bandwidth currently available on any one of the internal links.

3. The node of claim 1, the controller operable to:
determine, based on the maximum bandwidths for each of the at least two internal links, a maximum aggregate bandwidth available for a single new traffic flow; and
generate the link advertisement, the link advertisement comprising the maximum aggregate bandwidth of the internal links.

4. The node of claim 1, wherein the link advertisement does not identify all the internal links individually and their bandwidths.

5. The node of claim 1, wherein the link advertisement further comprises at least one of the following: an allocable aggregated protected bandwidth of all the internal links; a proportion of the bandwidth of the internal links currently occupied, and a maximum bandwidth of traffic flow at a number of priority levels.

6. The node of claim 5, wherein the protected bandwidth is a variable parameter indicating an aggregate of protected bandwidth currently available on all the internal links.

7. The node of claim 1, wherein the first switching matrix is arranged to use the first protocol to switch a variable bandwidth packet switched connection to communicate a traffic flow; and second switching matrix is arranged to use the second protocol to switch a fixed bandwidth circuit switched connection to communicate the traffic flow.

8. The node of claim 7, the traffic flows comprising label switched paths, and the fixed bandwidth circuit switched connection comprising a wavelength switched path.

9. The node of claim 1, the controller being arranged to use a GMPLS control plane protocol to send the link advertisement.

10. A method of generating a link advertisement at a hybrid node of a network, the hybrid node comprising switching matrices operable using different protocols and two or more internal links between the switching matrices, the internal links operable to pass a traffic flow between the first and second switching matrices and to adapt the traffic flow to suit the protocols of the switching matrices, the method comprising:

determining, for each of the two or more internal links, a maximum bandwidth available for a single new traffic flow and a minimum bandwidth allocable for a single new traffic flow;

determining, based on the minimum and maximum bandwidths for each of the two or more internal links, an overall maximum bandwidth on any one of the two or more internal links available for a single new traffic flow and an overall minimum bandwidth allocable on any one of the two or more internal inks for a single new traffic flow;

generating a link advertisement comprising the overall maximum bandwidth available for a single new traffic flow on any one of the internal links, and the overall minimum bandwidth allocable to such a new traffic flow; and sending the link advertisement to another part of the network.

11. A path computation element for a communications network, the path computation element comprising:
an interface operable to receive link advertisements from nodes of the communications network; and
a processor operable to:
select paths for new traffic flows based on the received link advertisements, wherein at least one of the nodes is a hybrid node having switching matrices operable using different protocols, and having two or more internal links between the switching matrices, the link advertisements received from the hybrid node comprising overall maximum and overall minimum bandwidths on any one of the internal links for a new traffic flow, wherein:
the overall maximum bandwidth represents a maximum bandwidth from a set comprising maximum bandwidths available for a single new traffic flow for each of the two or more internal links; and
the overall minimum bandwidth represents a minimum bandwidth from a set comprising minimum bandwidths allocable for a single new traffic flow for each of the two or more internal links; and
select a path via the hybrid node for a new traffic flow according to the bandwidth of the requested new traffic flow and according to the overall maximum and overall minimum bandwidths of the link advertisements.

12. The path computation element of claim 11, wherein the processor is operable to make the path selection according to the received link advertisement which further comprises at least one of the following a minimum bandwidth allocable to a traffic flow for switching onto one of the internal links; an aggregate protected bandwidth of all the internal links; a proportion of the bandwidth of the internal links currently occupied; a maximum aggregate bandwidth of the internal links, and a maximum bandwidth of traffic flow at a number of priority levels.

13. A method of operating a path computation element, the method comprising:
receiving a link advertisement from a hybrid node of a communications network, the hybrid node comprising switching matrices operable using different protocols, and comprising two or more internal links between the switching matrices, the link advertisements received from the hybrid node comprising overall maximum and overall minimum bandwidths on any one of the internal links for a new traffic flow wherein:
the overall maximum bandwidth represents a maximum bandwidth from a set comprising maximum bandwidths available for a single new traffic flow for each of the two or more internal links; and
the overall minimum bandwidth represents a minimum bandwidth from a set comprising minimum bandwidths allocable for a single new traffic flow for each of the two or more internal links; and
selecting a path for a new traffic flow based on the received link advertisements, such that a path via the hybrid node is selected according to a bandwidth of the requested new traffic flow and according to the overall maximum and overall minimum bandwidths of the link advertisement.

14. One or more non-transitory computer-readable storage media embodying software for a hybrid node of a network, the hybrid node comprising switching matrices operable using different protocols and two or more internal links between the switching matrices, the internal links operable to pass a traffic flow between the first and second switching matrices and to adapt the traffic flow to suit the protocols of the switching matrices, the software when executed by a processor is operable to perform the method of claim 10.

15. A node for a communications network, the node comprising:
   a plurality of external connections interconnected by a first switching matrix and operable according to a first protocol;
   a plurality of external connections interconnected by a second switching matrix and operable according to a second protocol;
   at least two internal links between the first and second switching matrices, each of the internal links being operable to pass a traffic flow between the first and second switching matrices and to adapt the traffic flow to suit the protocols of the switching matrices; and
   a controller operable to:
      determine, for each of the at least two internal links, a maximum protected bandwidth available for a single new traffic flow;
      determine a maximum aggregate protected bandwidth of all the internal links by aggregating the determined maximum protected bandwidths for each of the at least two internal links; and
      generate and send to another part of the network a link advertisement comprising the maximum aggregate protected bandwidth available for new traffic flows on all of the internal links.

16. A node for a communications network, the node comprising:
   a plurality of external connections interconnected by a first switching matrix and operable according to a first protocol;
   a plurality of external connections interconnected by a second switching matrix and operable according to a second protocol;
   at least two internal links between the first and second switching matrices, each of the internal links operable to pass a traffic flow between the first and second switching matrices and to adapt the traffic flow to suit the protocols of the switching matrices; and
   a controller operable to:
      determine, for each of the at least two internal links, a maximum bandwidth available for a single new traffic flow;
      determine a maximum aggregate bandwidth of all the internal links by aggregating the determined maximum bandwidths for each of the at least two internal links; and
      generate and send to another part of the network a link advertisement comprising the maximum aggregate bandwidth of all the internal links.

\* \* \* \* \*